United States Patent [19]
Ketcham

[11] Patent Number: 5,111,390
[45] Date of Patent: May 5, 1992

[54] SOFTWARE SECURITY SYSTEM FOR MAINTAINING INTEGRITY OF COMPILED OBJECT CODE BY RESTRICTING USERS ABILITY TO DEFINE COMPILERS

[75] Inventor: Larry R. Ketcham, Laguna Niguel, Calif.

[73] Assignee: Unisys Corporation, Blue Bell, Pa.

[21] Appl. No.: 234,772

[22] Filed: Aug. 22, 1988

[51] Int. Cl.⁵ .............. G06G 12/14; G06G 9/445; G06G 9/45; G06G 3/02

[52] U.S. Cl. .................... 395/725; 364/246.6; 364/286.4; 364/286; 364/286.5; 364/973; 364/286.2; 364/280.4; 364/969; 364/969.4; 364/948.2; 364/DIG. 1; 364/DIG. 2; 395/700

[58] Field of Search ... 364/200 MS File, 900 MS File, 364/300; 380/3, 4, 25, 26

[56] References Cited

U.S. PATENT DOCUMENTS

| | | | |
|---|---|---|---|
| 4,104,718 | 8/1978 | Poublan et al. | 364/200 |
| 4,328,542 | 5/1982 | Anastas | 364/200 |
| 4,357,529 | 11/1982 | Atalla | 235/380 |
| 4,471,163 | 9/1984 | Donald et al. | 364/200 |
| 4,498,132 | 2/1985 | Ahlstrom et al. | 364/200 |
| 4,532,507 | 7/1985 | Edson | 340/825.31 |
| 4,558,176 | 12/1985 | Arnold | 364/900 |
| 4,558,413 | 12/1985 | Schmidt | 364/200 |
| 4,590,557 | 5/1986 | Lillie | 364/200 |
| 4,644,493 | 2/1987 | Chandra | 364/900 |
| 4,652,990 | 3/1987 | Pailen et al. | 364/200 |
| 4,685,055 | 8/1987 | Thomas | 364/200 |
| 4,742,467 | 5/1988 | Messerich et al. | 364/200 |
| 4,791,565 | 12/1988 | Dunham et al. | 364/200 |
| 4,864,494 | 9/1989 | Kobus | 364/200 |

*Primary Examiner*—Archie E. Williams, Jr.
*Assistant Examiner*—Eric Coleman
*Attorney, Agent, or Firm*—Alfred W. Kozak; Nathan Cass; Robert S. Bramson

[57] ABSTRACT

A computer system which uses a main processor with main memory, and operates under a specialized software operating system, provides for checking the integrity of its compiler by use of software routines which permit an authorized user or an authorized program to authorize a file as a compiler and additionally will operate to identify any ordinary user and ordinary programs so as to prevent such ordinary user or ordinary program from authorizing a code file as a compiler.

7 Claims, 5 Drawing Sheets

SOFTWARE SECURITY SYSTEM FOR MAINTAINING INTEGRITY OF COMPILED OBJECT CODE BY RESTRICTING USERS ABILITY TO DEFINE COMPILERS

BACKGROUND OF THE INVENTION

In the present day usage of the many versatile computer systems available today, there is often the unrecognized problem of providing a situation of integrity and security wherein, it is hoped, no external or unfriendly user will be able to penetrate and access the data and programs of an existing computer system.

The threat of a system's security being compromised by user-written programs must be taken cognizance of, especially in an environment where the hardware is supportive of, rather than primarily responsible for, the enforcement of security.

The existing program code in a given computer system plays a central role in the situation where there may be threats to a software-based security architecture. As a result there is a requirement for the idea of "program containment" which involves issues that include questions as to the nature and extent of trust that should be placed in the compilers as well as the types of controls that must be placed on both the compilers used and on the programs they create.

In the succeeding descriptions, the term "code file" will be used in a particular sense which refers to a file that contains compiler-generated, machine-executable code. These are the types of code files that are used in the Unisys A Series computer systems.

The "code file" may be described as a file produced by a compiler when a program is compiled successfully. This file will contain instructions in machine-executable object code.

The "compiler" may be expressed as a program authorized to translate a program source from high-level language into machine-executable object code.

In the Unisys A Series system, the operating system is primarily responsible for enforcing the A Series security policies with respect to users, files, programs, and processes. There are two versions of the operating system available which involve (i) the MCP (Master Control Program) and (ii) the MCP/AS (Master Control Program/Advanced System). The succeeding description will refer to the operating system in the generic sense so as to include either version. The A Series provides high-level protection mechanisms which incorporate the principles of Discretionary Access Control (DAC), Identification and Authentication, Audit, Object Reuse, and Least Privileged Operations which have been described in the Trusted Computer System Evaluation Criteria published as Department of Defense Standard DOD 5200.28-STD, December 1985.

Thus the integrity of a computer system is highly dependent upon the level of trust that can be placed in the integrity of the code executed by the computer. When ordinary programs are allowed to create or to modify code, the computer system executing that code is vulnerable to compromise because no trust can be placed in code generated by uncontrolled programs.

On traditional computer systems, code and data are very often not differentiated well. As a result, data can often be executed as code, and ordinary programs are able to create code that can compromise the integrity of the computer systems.

"A Series" Unisys computers operate to identify code words in memory by a special hardware tag value (designated tag 3) Ordinary programs are denied the ability to manipulate the hardware tags. The Master Control Program (MCP) forces the tag of 3 onto the code words when it reads a code segment from a permanent code file into the memory of the host computer.

Although the hardware tag enforcement prevents ordinary programs from creating or modifying code in memory, a mechanism is needed to prevent arbitrary creation of code files on an external storage medium, such as a disk or tape unit. The previously filed patent application, U.S. Ser. No. 196,709 entitled "Restricting Code Generation to Authorized Compilers", provides the mechanism needed to prevent arbitrary creation of code files on such external storage media.

However, any system that restricts code generation to "authorized compilers" is vulnerable to compromise if the ability to "authorize" a compiler is not very carefully controlled.

The present disclosure provides a mechanism for limiting compiler authorization to properly privileged personnel.

CROSS-REFERENCES TO RELATED APPLICATIONS

This disclosure is related to U.S. patent application Ser. No. 196,709 filed May 20, 1988, entitled "Restricting Code Generation to Authorized Compilers" by inventor, Larry R. Ketcham.

SUMMARY OF THE INVENTION

The present system operates to prevent ordinary users or programs from "authorizing" a compiler while at the same time allowing a reasonable method for "properly privileged" personnel to authorize compilers for the system. The control of compilers is considered an important protection mechanism in a computer system which is capable of preventing ordinary programs from operating to create or to modify executable code files. The person setting up the system security may be called the "System Administrator".

In the presently described system, the right to generate code is restricted to only properly authorized compilers. The enforcement mechanism in the operating system uses the FILEKIND attribute of files in order to recognize compilers. The FILEKIND is a file attribute that describes the internal structure and the purpose of a given file. The value of the FILEKIND attribute indicates whether a file is a data file, a code file, a system file or an "authorized" compiler.

Only the operating system itself can assign the FILEKIND value that "authorizes" a program as a compiler, and only a user or process with the highest privilege on the system can request that the operating system authorize a compiler. The operating system will create or modify a code file only when requested by an authorized compiler.

The enforcement mechanism provided in the Master Control Program (MCP) uses the FILEKIND attribute of files in order to recognize compilers. Only the Master Control Program (MCP) can assign the FILEKIND value that "authorizes" a program as a compiler and only a user or a process having the highest privilege on the system can request that the Master Control Program authorize a compiler. The Master Control Program (MCP) will create or modify a code file only when requested by an authorized compiler.

System interfaces are provided that allow a properly privileged person to authorize a compiler by one of the following methods: (i) directly entering the system command "MC" (Make Compiler); (ii) making menu selections and filling out a form so that the system command MC is indirectly entered; or (iii) running a program that invokes (directly or indirectly) the MCP entry point SETSTATUS in order to make a compiler.

All of the above-mentioned methods ultimately depend upon the Master Control Program (MCP) entry point SETSTATUS to actually authorize a specified code file as a compiler. The name of the code file to authorize is passed as a parameter to SETSTATUS, having been specified either by the user entering the MC (Make Compiler) command or by the program invoking SETSTATUS.

Because the entry point SETSTATUS is part of the Master Control Program, it is able to change the FILEKIND of the code file into the COMPILERCODEFILE value through a low-level interface (direct write to the disk file header of the code file) which is denied to non-MCP programs.

Although SETSTATUS is the only mechanism that can authorize the compiler, the SETSTATUS entry point must be guarded in order to prevent its use by improperly privileged personnel or programs. The procedure SETSTATUS protects itself by checking whether it was called by a "privileged" process, after which it may return an error if an "unprivileged" process had called it. A privileged process is either a program designated as privileged within the system command PP (Privileged Program), or a program being executed on behalf of a privileged user, or an independent runner, which is an MCP process that functions in a separate process stack and runs asynchronously with all other processes in the system. Also, another privileged process could be an MCS or message control system which involves a process having special privileges and responsibilities for data communication.

When a user attempts to interactively enter the MC (Make Compiler) command or use certain menus/forms to generate the MC command, the intermediate layers of system software must further guard the SETSTATUS entry point. In order for an interactive user to initiate an MC command, he must either use a specially designated operator's display terminal (ODT) or be identified as a user with sufficient privilege. These restrictions are enforced on the interactive user by means of MARC which is a menu-driven interface to the Unisys A Series and Unisys B5000/B6000/B7000 computer systems whereby MARC provides varying degrees of system query and control to users such that MARC runs as a transaction processor under a generalized message control system (MCS). MARC is aided in enforcing these restrictions by CONTROLLER which is the command interpreter for the operating system.

When a program attempts to invoke SETSTATUS indirectly (by calling DCKEYIN, an MCP entry point, and entering the MC command) then DCKEYIN also enforces the restriction that the calling program must be a privileged process.

Thus there is provided a system of checks and controls which insures that only properly privileged personnel or their designated programs will be allowed to authorize compilers.

BRIEF DESCRIPTION OF THE DRAWINGS

FIG. 5 which includes

DESCRIPTION OF PREFERRED EMBODIMENT

Figure 1:
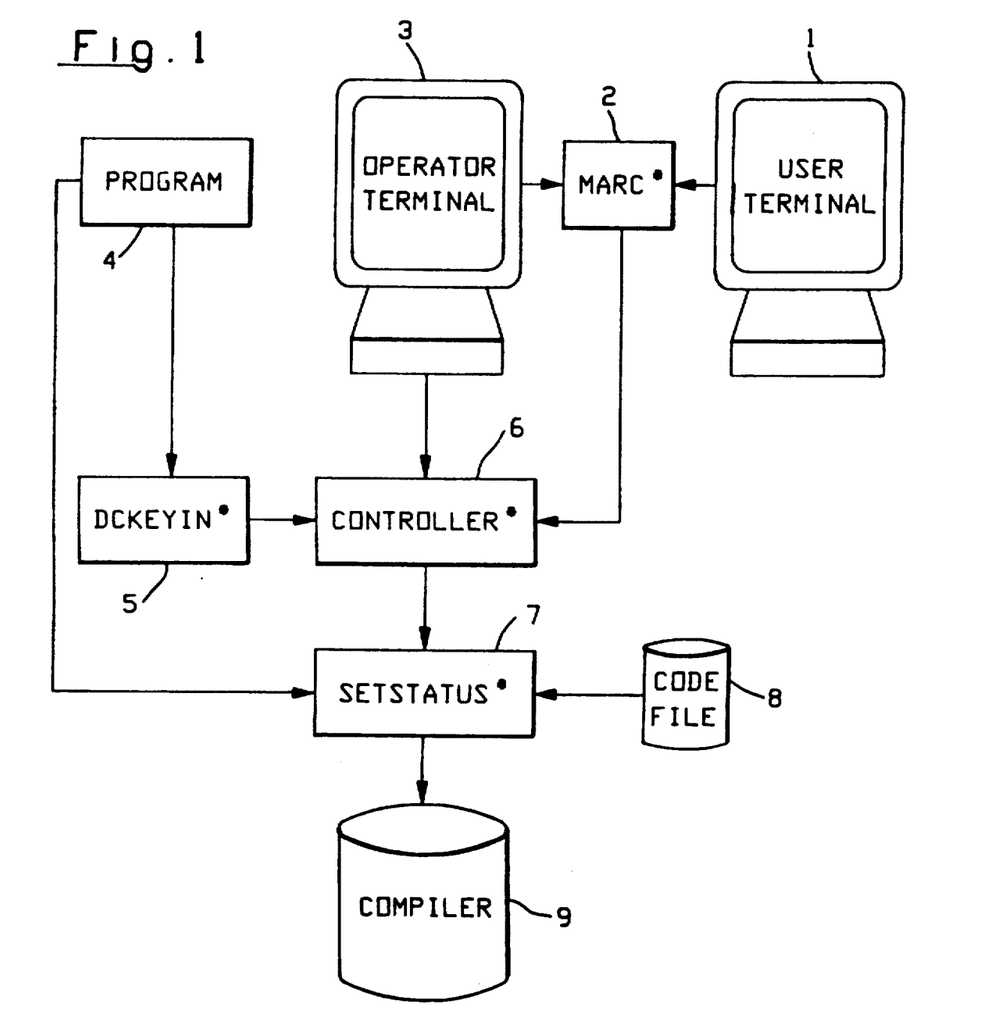
FIG. 1 is a block diagram of the compiler authorization architecture.

The architecture for the compiler authorization method is illustrated in the block diagram of FIG. 1. The MARC (menu-assisted resource control) interface 2 receives inputs from a user terminal 1 and an operator terminal 3. The MARC interface provides varying degrees of system query and of system control to the users. It may run as a transaction processor under a generalized message control system (MCS). The message control system is a particular process having special privileges and responsibilities for data communication.

The CONTROLLER 6 receives input from the operator terminal 3 and from the MARC interface 2. The CONTROLLER is an independent runner of the Master Control Program that serves as a command interpreter and also as a message router for the operating system. Additionally, the CONTROLLER 6 receives an input from the software procedure DCKEYIN, which is the Master Control Program procedure that provides the mechanism for privileged processes to send command messages to the CONTROLLER 6.

The program 4 resides in memory and provides input to the DCKEYIN routine 5. The program 4 also provides input to the SETSTATUS procedure 7 which also receives input from the CONTROLLER 6 and from the code file 8. The SETSTATUS is the MCP procedure that acts as the security mechanism for the operational state changes in the system and ensures that the system control functions it provides are executed only by appropriately privileged personnel or their appropriately designated programs.

The element 9 indicates the compiler which translates the source code into the machine-executable object codes.

Based on the command inputs, SETSTATUS transforms an ordinary code file 8 into a compiler 9.

Figures 2, 3:
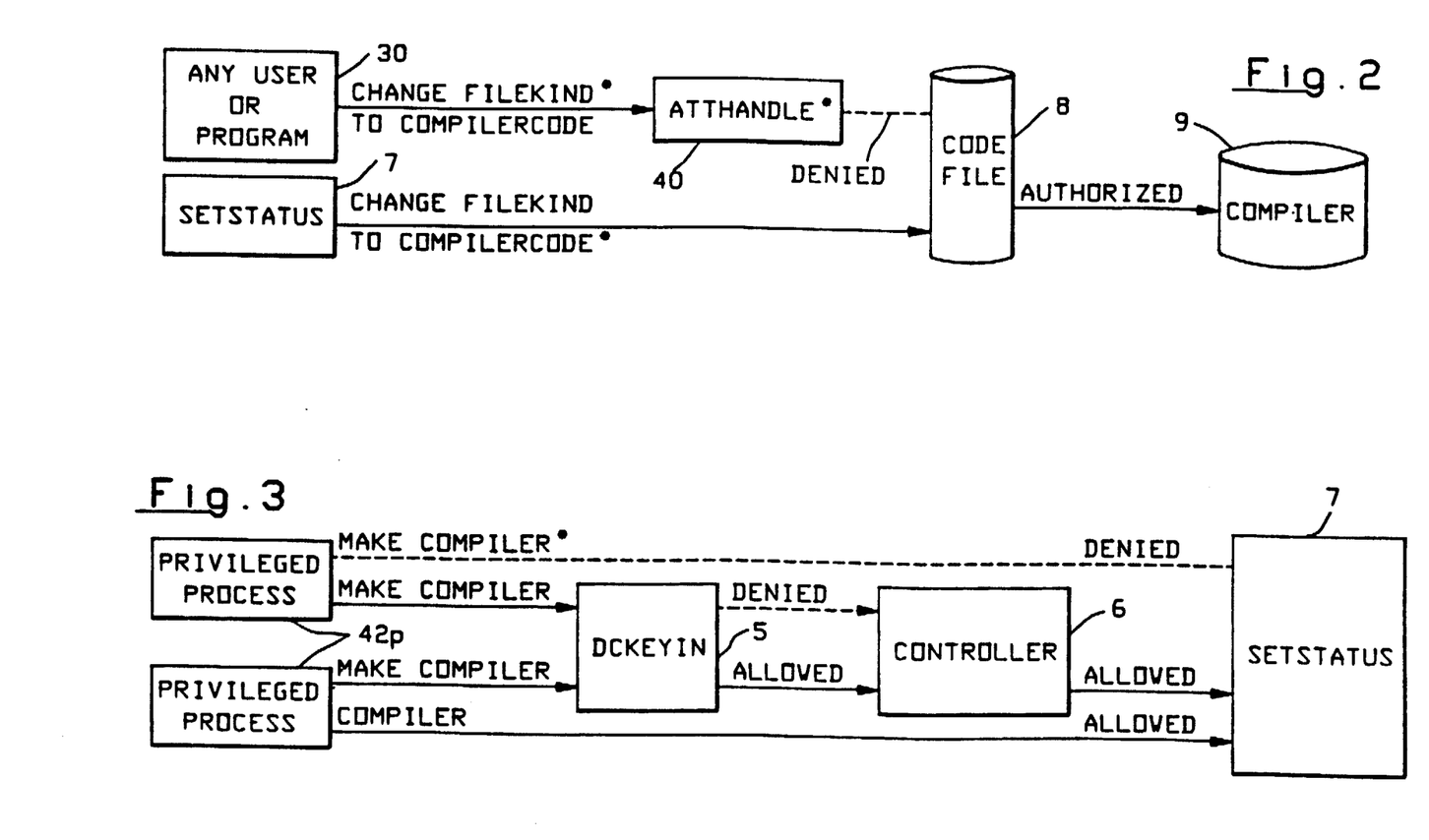
FIG. 2 is a block diagram of the FILEKIND controls that restrict the ability to authorize a compiler.
FIG. 3 is a block diagram of the restrictions placed upon processes that attempt to authorize a compiler via interfaces to the procedure SETSTATUS.

Referring to FIG. 2, there is indicated a block diagram of the FILEKIND controls that restrict the system's ability to authorize a compiler. When any user or program attempts to change the FILEKIND into the COMPILERCODEFILE value, it is intercepted by the ATTHANDLE procedure 40 which is the MCP procedure that provides the security mechanism for controlling changes to file attributes. In particular, the ATTHANDLE process prevents any process from changing the FILEKIND attribute into the COMPILERCODEFILE value. Thus, as indicated in FIG. 2, the code file 8 may not be influenced by the channel whose source is any user or program 30. However, when the SETSTATUS procedure of the MCP is executed, then the change of the FILEKIND into the COMPUTER- CODEFILE value is allowed and the code file 8 becomes authorized to operate as a compiler.

As seen in FIG. 3, there is shown a block diagram of the restrictions placed upon any of the processes that attempt to authorize a compiler via interfaces to the SETSTATUS procedure. In FIG. 3, if an ordinary process attempts to make and create a compiler, the SETSTATUS procedure 7 will deny this attempt. However, if the ordinary process 40p attempts to make a compiler through the DCKEYIN (which is the procedure that provides for privileged processes to send command messages to the CONTROLLER), the ordinary process 40p will be denied; while if the process is a privileged process such as 42p, then DCKEYIN 5 will allow the transmittal to the CONTROLLER 6 which permits the transmission to the SETSTATUS 7 in order to allow the privileged process 42p to create a compiler. The privileged process 42p is also allowed to invoke SETSTATUS 7 directly to create a compiler.

Figure 4:
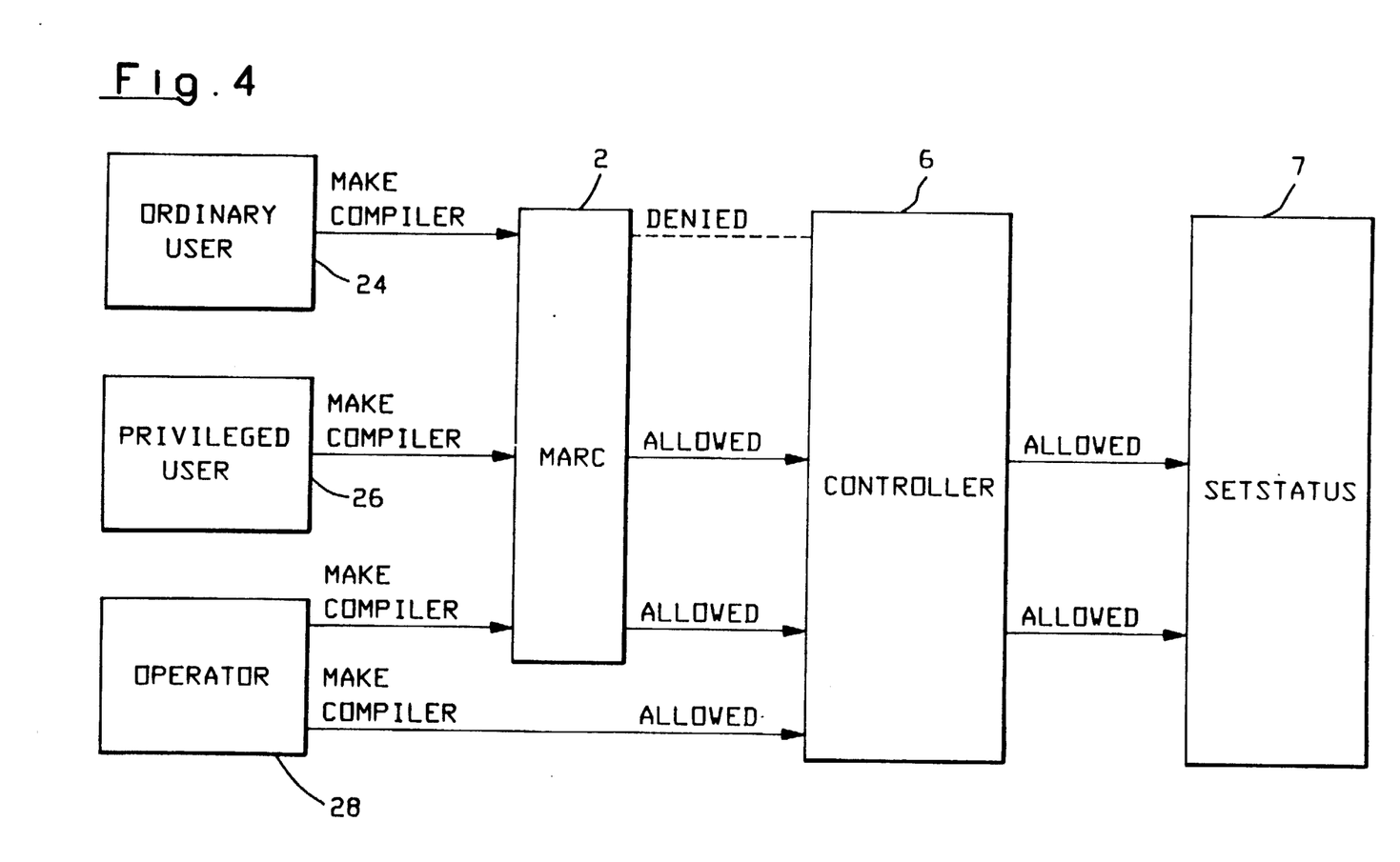
FIG. 4 is a block diagram of the restrictions placed upon personnel who attempt to authorize a compiler via interfaces to the procedure SETSTATUS.

Now referring to FIG. 4, there is a block diagram seen of the restrictions placed upon personnel who attempt to authorize a compiler via interfaces to the SETSTATUS procedure.

There are three classes of users indicated here which are the ordinary user 24, the privileged user 26, and the operator 28. It will be seen that when the ordinary user 24 tries to make a compiler via the menu-driven interface. , it will be denied by MARC 2. However, if the attempt is made by the privileged user 26 or the operator 28, MARC 2 will permit the transmission of the request to the CONTROLLER 6, which will permit the SETSTATUS procedure 7 to accept the command for making the compiler 9. (FIG. 1).

An operator 28, at a specially designated operator's terminal 3 can also bypass MARC 2 and issue commands to CONTROLLER 6 directly.

Figure 5:
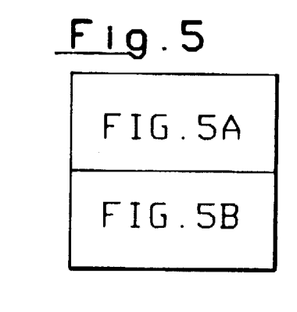
Figure 5A:
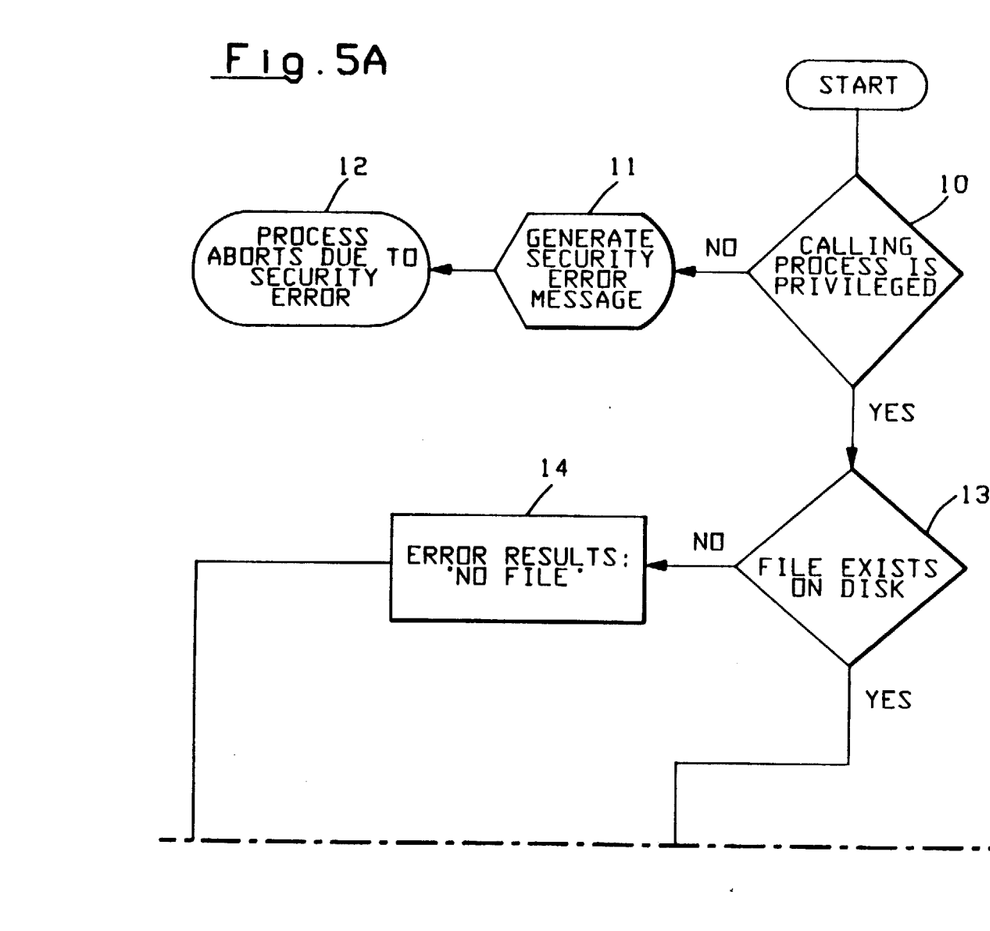
FIGS. 5A and 5B illustrates a flow diagram of the SETSTATUS mechanism that controls compiler authorization.
Figure 5B:
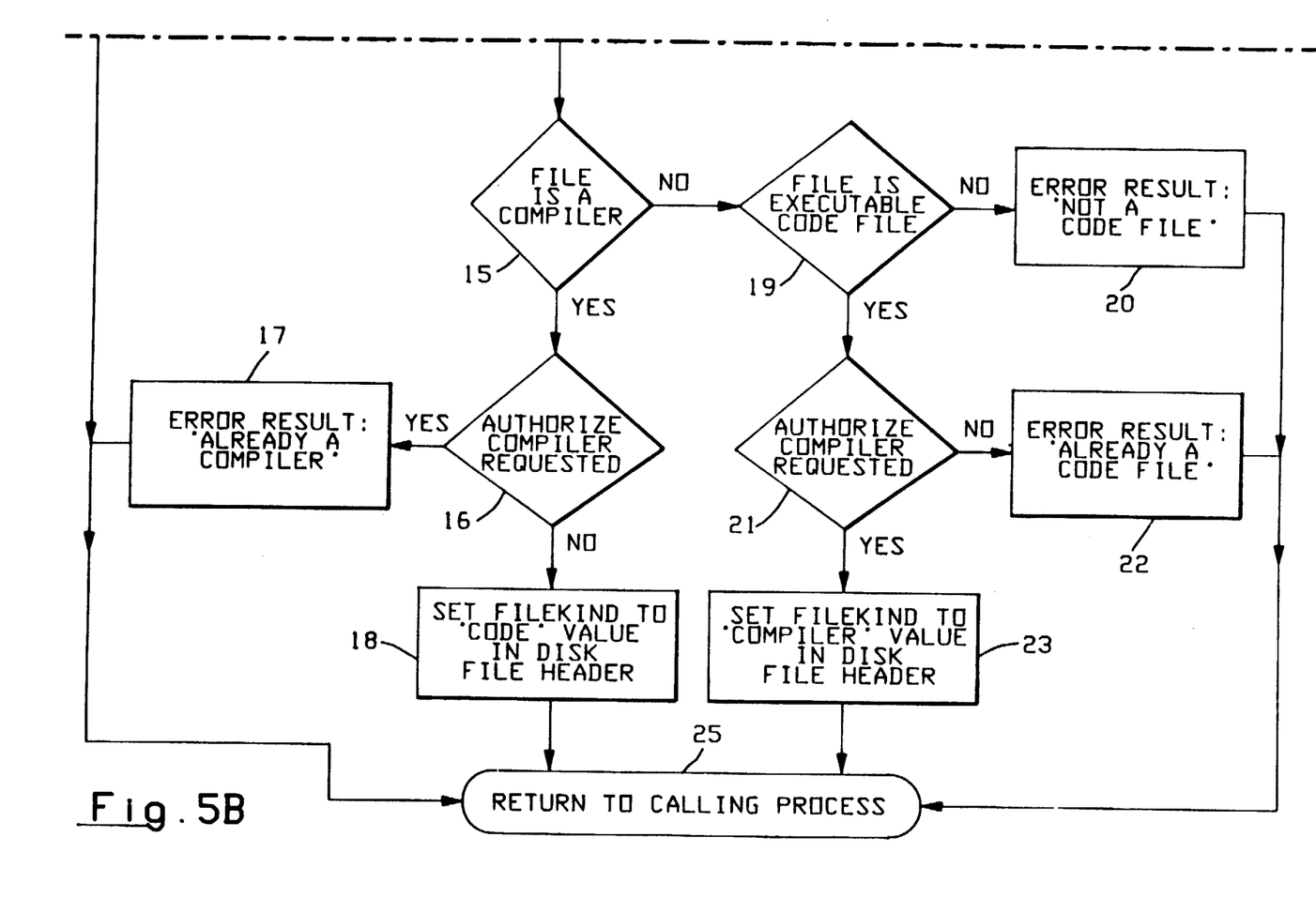

FIG. 5 illustrates a flow diagram of the SETSTATUS mechanism that controls compiler authorization. This SETSTATUS procedure is the key point 7 shown in FIG. 1 which authorizes the code file 8 to become the compiler 9.

As seen in FIG. 5, at decision block 10, the query is posed as to whether the calling process is privileged. If not, then block 11 generates a security error message which is conveyed to block 12 which aborts the process.

At decision block 10, if the calling process is privileged (yes), then decision block 13 queries as to whether a file (the file named in the "Make Compiler" request) exists on disk. If not, then the block 14 provides an error result indicating "no file" and then returns to the calling process, that is, the process which originally invoked the SETSTATUS procedure.

At decision block 13, if a file (the file named in the "Make Compiler" request) does exist on disk, then decision block 15 comes into operation to indicate whether or not the file is a compiler or not. If not, then decision block 19 queries whether the file is an executable code file. If not, then block 20 indicates an error result that it is not a code file, after which the system returns to the calling process.

At decision block 19, if the file is an executable code file, then the routine continues with decision block 21, which is a decision as to whether the request is to authorize or to remove authorization from a compiler. If removal of authorization is requested, then block 22 indicates an "error result" indicating that the file is already just a code file.

At decision block 21, if it is indicated that authorization for a compiler is requested (yes), then block 23 operates to set FILEKIND to the "compiler" value (the COMPILERCODEFILE value) in the disk file header, after which the system returns to the calling process.

Returning to decision block 15, if the file is a compiler (yes), then the next decision block 16 provides a query as to whether authorization or removal of authorization of a compiler is requested. If authorization is requested (yes), then block 17 indicates an error since the file is already a compiler.

At decision block 16, if it is not a request to authorize a compiler (no), then block 18 will set the FILEKIND to a "code" value in the disk file header (thereby removing compiler authorization from the code file), after which the system returns to the calling process.

In terms of functional operation, FIG. 1 previously illustrated the basic components involved in compiler authorization. Attempts to authorize a compiler 9 can be made by a user at a terminal such as terminal 1, or by an operator at a specially designated operator terminal 3, or by a program as indicated in block 4. In block 2, MARC is a menu-driven interface that the terminal user 1 may use when attempting to authorize a compiler. MARC filters the user's requests in accordance with the user's privileges. If the user is not privileged to issue commands that affect the system operation, then MARC 2 denies the user's request.

However, if the user 1 is privileged to issue system operation commands, then MARC 2 passes the user's request on to the CONTROLLER 6 since MARC 2 is permitted to send command messages to the CONTROLLER 6 because MARC 2 is part of a message control system (MCS).

CONTROLLER 6 is the command interpreter for the operating system. It is message-driven, and accepts messages only from privileged processes. CONTROLLER 6 parses the command and invokes the MCP entry point SETSTATUS 7 in order to accomplish the requested action. The CONTROLLER 6 is permitted to call SETSTATUS because the CONTROLLER 6 is an independent runner of the Master Control Program (MCP). The operator at the operator terminal 3, FIG. 1, may use the menus of MARC 2 in order to request authorization of a compiler, or the operator may enter commands that are handled directly by the CONTROLLER 6. Because access to the operator terminal 3 automatically implies the privilege to issue system operation commands, then neither MARC 2 nor the CONTROLLER 6 will inhibit the passing of the operator's commands to the SETSTATUS 7. The operator 3 or the user 1 can also run programs 4 in order to attempt compiler authorization. In order to programmatically authorize a compiler, the program 4 must either invoke SETSTATUS 7 directly or use the MCP entry point DCKEYIN 5 to indirectly invoke SETSTATUS.

DCKEYIN 5 allows a program 4 to issue commands in the same interactive language that operators use at their terminals. However, DCKEYIN 5 requires that any program calling it must be a "privileged" process; otherwise, any commands issued by the program are denied. A "privileged" process results when a privileged user runs a program or when any user runs a program that has been granted privilege via the PP (Privileged Program) command. Other types of privileged processes would involve an MCS or an independent runner of the Master Control Program, MCP.

If the calling program is a privileged process, then DCKEYIN 5 sends a message to the CONTROLLER 6 so that the command can be passed to SETSTATUS 7.

When a program 4 directly invokes SETSTATUS 7, it must issue commands in encoded form according to the defined programmatic interface for SETSTATUS. SETSTATUS 7 requires that any process calling it must be privileged; otherwise any commands issued by that process are denied.

The SETSTATUS 7 takes a code file 8 specified in the command string and checks several conditions before authorizing the code file 8 as a compiler 9. The flow of the relevant portions of SETSTATUS is illustrated in FIG. 5. Compiler authorization is just one of a variety of system control functions that are handled by SETSTATUS 7.

Referring next to FIGS. 2, 3 and 4, it will be seen that these figures depict restrictions concerning the authorization of compilers.

Since only personnel with the appropriate privilege (or programs 4 which are specifically granted privilege by such personnel) are allowed to authorize a compiler, these restrictions will be enforced primarily by the SETSTATUS mechanism of the Master Control Program (MCP) with the additional safeguards imposed by MARC 2, CONTROLLER 6, and the Master Control Program (MCP) mechanisms designated as ATTHANDLE and DCKEYIN.

As will be noticed in FIG. 2, ATTHANDLE 40 operates to prevent any user or program from changing the FILEKIND attribute of a code file 8 to the COMPILERCODEFILE value. This restriction insures that only the SETSTATUS mechanism 7 is capable of authorizing a compiler.

Referring to FIG. 3, SETSTATUS 7 provides additional assurance that any attempt by an "ordinary" process to authorize a compiler is denied. However, SETSTATUS 7 does allow a privileged process 42p or a CONTROLLER 6 (which is privileged because it is an independent runner of the MCP) to invoke the MC (Make Compiler) function in order to authorize a compiler.

Because the CONTROLLER 6 has access to SETSTATUS 7, DCKEYIN 5 performs additional checking on its caller in order to avoid sending a command message to CONTROLLER 6 on behalf of an ordinary process. DCKEYIN 7 will pass a command message, such as the MC (Make Compiler) command to the CONTROLLER 6 only if the calling process is "privileged".

FIG. 4 illustrates the restrictions placed on users attempting to authorize a compiler via an interactive interface. The only interactive interface with the potential for accessing SETSTATUS 7 that is available to an ordinary user is MARC 2; however, MARC 2 will deny any attempt by an ordinary user 24 to issue the MC command.

On the other hand, MARC 2 does allow a privileged user 26 or an operator 28 to issue the MC command. For those personnel (26 and 28), MARC 2 sends the command message on to the CONTROLLER 6. It may be noted that an operator at a specially designated operator's terminal 3 can bypass MARC 2 and issue commands to CONTROLLER 6 directly. In either case, CONTROLLER 6 reacts to the MC command by invoking SETSTATUS 7 in order to authorize a compiler 9.

The operational flow sequence of the SETSTATUS mechanism is illustrated in FIG. 5, which particularly emphasizes those portions which are relevant to the MC or "Make Compiler" function of the SETSTATUS operation. When SETSTATUS is requested to authorize a compiler via the "Make Compiler" function, it first checks whether the calling process is privileged or not as seen at decision block 10.

If the caller is not privileged, then SETSTATUS generates a security error message as seen at block 11 and then aborts the process due to the security error as seen in block 12.

At the decision block 10, if it is determined that the calling process is privileged, then the SETSTATUS sequence continues with the decision block 13 which checks whether the file named in the MC (Make Compiler) request actually exists on the disk. If the file does not exist on disk, then SETSTATUS generates an "error result" as seen at block 14, indicating that no file by that name exists, after which the sequence returns back to the calling process as seen at block 25. If the decision block 13 determines that the file does exist (yes), then SETSTATUS continues to decision block 15 which checks whether the file named in the Make Compiler (MC) request is already a compiler. If decision block 15 determines that the file is already a compiler, then SETSTATUS will operate at decision block 16 to determine whether the MC request is attempting to authorize a compiler or to remove the authorization from a compiler.

It may be noted that there are two forms of the Make Compiler (MC) command. One forms authorizes a compiler while the other form removes the authorization from a compiler.

If the decision block 16 determines that the MC request is attempting to authorize a compiler (yes), then SETSTATUS generates an "error result" as seen in block 17 indicating that the file is "already a compiler" and the sequence returns back to the calling process as seen at block 25.

At decision block 16, if it is determined that the MC request is attempting to "remove" authorization from the compiler (no), then block 18 operates to change the FILEKIND of the compiler back to the CODEFILE value by directly accessing the disk file header of the code file. As a result, the code file (item 8 of FIG. 2) is no longer authorized as a compiler. Thus the operation of block 18, after having removed authorization from the compiler, then permits the SETSTATUS sequence to return to the calling process as seen at block 25.

It may be noted that the above-mentioned disk file header is a data structure that contains information about a disk file. This information includes various file attributes in addition to the physical location of the file on the disk. The disk file header of the permanent file is stored in a system-maintained directory of the family of logically grouped disks on which that file resides.

The "file" connotes a named group of related records. A "temporary" file exists only within the scope and execution timeframe of the program that creates it. A "permanent" file will exist independently of the program that creates it and is usually stored on a physical medium such as a disk or tape. The "file structure" is an element that describes a characteristic of a file and provides the information the system needs to handle the file.

At the decision block 15, if it is determined that the file names in the "Make Compiler" request is not a compiler (no), the SETSTATUS sequence then moves to decision block 19 in order to perform additional checks. At decision block 19, a determination is made as to whether the file in question is an executable code file. If the file is not an executable code file (no), then SETSTATUS generates an error result as seen at block 20 indicating that the MC request named a file that is not an appropriate code file and then returns the system to the calling process as seen at block 25.

At decision block 19, if it is determined that the file named in the MC request is an executable code file (yes), then SETSTATUS continues at decision block 21 to determine which form of the MC request is being processed. If decision block 21 determines that the MC request is attempting to remove authorization (no), then SETSTATUS operates at block 22 to generate an error result, indicating that the file in question is just a code file. Thus removing any compiler authorization is unnecessary, because the file has no authorization, after which the system returns to the calling process as seen at block 25.

At decision block 21, if it is determined that the MC request is attempting to authorize a compiler (yes), then block 23 indicates that the FILEKIND of the file will be changed to the COMPILERCODEFILE value by directly accessing the disk file header of that code file. As a result, the code file becomes "authorized" as a compiler. Thus having granted compiler authorization at block 23 to the code file, SETSTATUS then returns to the calling process as seen at block 25.

The attached Appendix I provides a source code listing of this described method.

While the described method for limiting compiler authorization has been delineated in a particular embodiment, it is understood that other implementations may be devised but which still fall within the scope of the inventive concept as stated in the attached claims.

APPENDIX I

```
* xxxxxxxxxx          The beginning of SETSTATUS              xxxxxxxxxx
     SAVEVALUES:= 0 & TYPE     [47:8]
                    & SUBTYPE  [39:8]
                    & V        [31:8];
     IF NOT((PRIVILEGED(SNR)) COR HOSTSERVICESCALLING) THEN
        BEGIN
           MESSER( 29 & IPCERRSEC WHOF
                      & 1        DSJOBF
                    ,0);
           KANGAROO(SNR,TODS,DSED & PROGRAMCAUSE HISCAUSEF
                                 & SECURITYERRORV HISREASONF);
           SETSTATUSERROR(0);
           GO XIT;
        END;
     IF NOT PRESENT(A) THEN % WATCH FOR HUGE ARRAYS
        DESCRIPTOR AT A :=
           PRESENCEBIT(DESCRIPTOR AT A,
                       COMPLEMENT(STACKINFO[SNR]).IRINDICATORF);
        IF N := LASTWORD := A[0] LSS 2 THEN
           BEGIN
              SETSTATUSERROR(35);   % BAD INTERNAL POINTER
              GO XIT;
           END;
        IF N + 3*TYPE.ORGUSERF GEQ SIZE(A) THEN
           BEGIN
              SETSTATUSERROR(36);   % A TOO SHORT TO HOLD ORIGINUSER
              GO XIT;
           END;
        DEBUG := BOOLEAN(TYPE).DEBUGF;
        ORIGINUNIT := TYPE.ORIGINUNITF;
        IF BOOLEAN(TYPE).ORGUSERF THEN
           BEGIN % 3 WORD USERCODE ON END OF INFO IN "A" ARRAY
              REPLACE POINTER(ORIGINUSER) BY POINTER(A[SIZE(A)-3]) FOR
                 3 WORDS;
              USERSPEC:=ORIGINUSER[0].[47:8] NEQ 0;
           END;
        MAXPHYSICALUNIT := GETUNITINFO(0,MAXPHYSICALUNITNUMBERV);
        TYPE := TYPE.TYPEF; % NOTE: AFTER GETTING INTO THE PROPER CASE,
                            % TYPE CONTAINS AI, ETC, INSTEAD OF "TYPE"
        CASE TYPE OF
           BEGIN
              (0):     BEGIN
                          IF NOT BOOLEAN(ORIGINUNIT.ORGISREMOTEF) THEN
                             ORIGINUNIT.ORGUNITF :=
                                EXTTOLOGUNITID(ORIGINUNIT.ORGUNITF);
                          MIXREQUEST;
                       END;
              (1):     UNITREQUEST(FALSE); % USING UNIT NUMBERS.
              (2):     MISCREQUEST;
```

```
            (5):    UNITREQUEST(TRUE);  % USING DEVICE NAMES.
            ELSE:   BEGIN
                       SETSTATUSERROR(37);
                       GO XIT;
                       END;
            END;

TYPE    := SAVEVALUES.[47:8]; % RESTORE SAVED VALUES
         SUBTYPE := SAVEVALUES.[39:8];
         IF NOT (   (TYPE=0 AND  SUBTYPE=16)     % DCKEYIN
                OR (TYPE=2 AND (    SUBTYPE=30   % SYSTEM/BACKUP
                                OR  SUBTYPE=31   % START STATISTICS
                                OR  SUBTYPE=37   % SYSTEM/SUSPENDER
                                OR (SUBTYPE=0 AND V.[46:1]=1)
                                              % CONTROLLER ADM EVENT
                               ))
                OR (LEVELBETA CAND (TYPE=2 CAND SUBTYPE=13))) THEN
                                        % DO NOT LOG THE ABOVE CASES....
             BEGIN
                LONG ARRAY LG[0:SIZE(A)+LOGTYPEX+1];
                LOGSETSTATUS(LG,SAVEVALUES,A,SIZE(A));
                WRITELOG(SNR,LENGTHOFSETSTATUSLOGREC(LASTWORD)
                        & LOGSIGN SIGNBITF,LG,FALSE);
             END;
         DMSG:= WORD(0);
  XIT:
     END SETSTATUS;

* XXXXXXXXXX   The Make Compiler (MC) function of SETSTATUS    XXXXXXXXXX
 *
            7:  BEGIN  % MARK AS COMPILER <--------------------------
                   IF I:=STRINGERR(FPBV,N) LSS 0 THEN
                      GO TO FINISHED;
                   IF I:=FINDAFILE(P,0 & 1 FAFNOACCESSF ) LSS 0 THEN
                      BEGIN
                         ERR(FILENOTONDISK);
                         GO TO FINISHED;
                      END;
                   ACQUIREFILEHEADER(I);
                   HDR:=HEADERDESC(I);
                   IF (K:=FILEKIND(HDR)) IS COMPILERCODEFILE THEN
                      IF BSET THEN
                         ERR(ISACOMPILER)
                      ELSE
                         BEGIN
                            SETFILEKIND(HDR,CODEFILE);
                            TIMESTAMPHEADER(HDR);
                         END
                   ELSE
                      IF NOT EXECUTABLE(K) THEN
                         ERR(NOTACODEFILE)
                      ELSE
                         IF BSET THEN
                            BEGIN
                               SETFILEKIND(HDR,COMPILERCODEFILE);
                            END
                         ELSE
                            ERR(ISACODEFILE);
                   UNLOCKFILEHEADER(I);
                   IF ERRNUM IS 0 THEN
                      FILEHANDLER (HDR, FHTIMESTAMPV & 1 FHHDRPASSEDF,
                                   EMPTYDESCRIPTOR,0);
                   RELEASEHEADER(I, 0 & 1 UPDATEDF);
                END;

* XXXXXXXXXX       The FILEKIND controls of ATTHANDLE          XXXXXXXXXX
 *
    ATTNO(FILEKINDAV):                              % FILE.FILEKIND     58
          BEGIN
          ARRAY REFERENCE HDR[0];
          WORD TEMPW;
          REAL OLDFILEKIND;
          BOOLEAN PROCEDURE FIBSTACKSETFILEKIND = TEMPW(HDR,NEWFK);
                 VALUE     NEWFK;
                 DESCRIPTOR HDR;
                 REAL      NEWFK;                        NULL;
```

```
                IF RANGE(0,255) THEN
                    IF NOT(MSG := (TYPE=FPBV OR TYPE=FAMSGV)
                                  AND (ARGH LEQ VALUE(CODEFILE))) THEN

% SETTING FILEKIND THROUGH EITHER A
                        % LABEL-EQUATION OR AN FA BY THE USER IS
                        % NOT ALLOWED IF VALUE OF THE FILEKIND IS LESS
                        % THAN OR EQUAL TO VALUE OF CODEFILE.

BEGIN
                    IF UNITNOTRETAINED THEN
                            BEGIN
                            LEBFILEKIND := ARGH;
                            END
                    ELSE

IF DISC THEN
                        % ENTER HERE IF DISC HAS BEEN ASSIGNED.

BEGIN
                        SETLEBVALIDITY := FALSE;
                        HDR := DESCRIPTOR AT DISKHEADER;
                        OLDFILEKIND := FILEKIND (HDR);
                        TEMPW := PFLOATSIRW;
                        PFLOAT := SETFILEKINDPCW &SELECTOR.SIRWSTKNRF
                                                                PCWSTKNRF;
                        MSG := FIBSTACKSETFILEKIND(HDR,ARGH);
                        IF (NOT MSG) CAND (ARGH NEQ OLDFILEKIND) THEN
                            BEGIN
                            % Force CATALOG to be updated.
                            LOCKEDSETTIMESTAMPSYNCED (HDR, FALSE);
                            FILEHANDLER(HDR,FHTIMESTAMPV & 1 FHHDRPASSEDF
                                       ,EMPTYDESCRIPTOR,0);
                            LOCKEDSETWRITTENON(HDR,TRUE);
                            END;
                        END
                ELSE
%                       CAN BE SET WHILE OPEN ONLY IF LOCAL OR FOREIGN DISK
                        MSG := NOT FOREIGNFILE;
                    END;
            END;

PROCEDURE DCKEYIN (P,A);
VALUE P;
POINTER P;
ARRAY A[0];
%%%%%%%%%%%%%%%     THIS INTRINSIC MAY BE CALLED FROM A DCALGOL PROGRAM
              %     WITH P POINTING TO A "SPO INPUT" MESSAGE.
              %     THE "SPO OUTPUT" IS RETURNED IN THE ARRAY A.
BEGIN
POINTER Q, PA;
WORD WP = P, WA = PA;
DEFINE
        BSIZEF  = [42:03] # ,
        ETX     = 4"03" # ,
        NUL     = 4"00" # ;
TRUTHSET ALPHANUMERIC("ABCDEFGHIJKLMNOPQRSTUVWXYZ0123456789@");
BOOLEAN ADDRESSFIELDS_EQUAL;   % LOCAL BOOLEAN ONLY USED ONCE TO  SHORTEN
                               % THE SIZE OF A CONTROLSTATE BLOCK.

PA:=POINTER(A,8);
    BEGIN [CONTROLSTATE]
    IF ASDINDEXOF(WP) EQL ASDINDEXOF(WA) THEN
        ADDRESSFIELDS_EQUAL:=TRUE
    END CONTROLSTATE;

IF ADDRESSFIELDS_EQUAL THEN
        REPLACE PA BY 8"FIRST PARAMETER POINTS INTO SECOND"
    ELSE
      IF WP.BSIZEF NEQ WA.BSIZEF THEN
        REPLACE PA BY 8"NOT EIGHT BIT POINTER"
      ELSE
        BEGIN
            SCAN Q:P WHILE = 8' ';
```

```
            IF Q IN ALPHANUMERIC THEN
                BEGIN       % EVERYTHING SEEMS OK.
                    REPLACE PA BY 8"        ", Q UNTIL = NUL, ETX;
                    DCKEYINP(A);
                END
            ELSE
                REPLACE PA BY 8"ILLEGAL INITIAL CHARACTER";
        END;
    END OF DCKEYIN;

* XXXXXXXXXX          The DCKEYIN entry point              XXXXXXXXXXX
*
    PROCEDURE DCKEYINP = ( 0, 89 ) (WU);
      VALUE WU;
      WORD  WU;
      BEGIN
        ARRAY REFERENCE A = WU[0];
        ARRAY MSG[TBS];
        BOOLEAN BRD;
        REAL TEMP,MSGLENGTH;
        LABEL EXT;
          IF NOT PRIVILEGED(SNR) OR BRD:=SIZE(A) GTR 256 THEN
            BEGIN
              MESSER( (IF BRD THEN 65
                       ELSE 29) & IPCERRSEC WHOF
                             & 1           DSJOBF
                  ,0);
              KANGAROO(SNR,TODS,IF BRD
                       THEN DSED & RESOURCECAUSE HISCAUSEF
                                 & MEMORYEXCEEDEDV HISREASONF
                       ELSE DSED & PROGRAMCAUSE HISCAUSEF
                                 & SECURITYERRORV HISREASONF);
              GO TO EXT;
            END;
          IF SIZE(A) LSS 4 THEN GO EXT;
          DCALLOCATE(MSG,(MSGLENGTH:=SIZE(A) ) + 3);
          REPLACE POINTER(MSG[3],8) BY POINTER(WU,8) FOR TEMP:MSGLENGTH*6
                              WHILE NEQ 4'03';         % 'WHILE NEQ ETX'
          MSG[0]:=0 & MSGLENGTH LENGTHF & DCKEYMSG LOWER2OF;
          MSG[1]:=TASKSERIAL(SNR).TSKNRF;
          MSG[2]:=MSGLENGTH*6-TEMP;
          RESET(REPLYEVENT(SNR));
          REPLYWORD(SNR):=0 & 1 [DCV:1] & 1 [DSV:1];
          SENDDCKEYINTOCONTROLLER(MSG);
          DCALLOCATE(MSG,MSGLENGTH:=MSGLENGTH-1 );
          WAIT[DSABLE,DELAYSWAP](REPLYEVENT(SNR));
          IF STACKLOGICALLYDSED THEN
            REPLYWORD(SNR):=0
          ELSE
            IF NOT GETMESSAGE(SNR,AXLINE,MSG,0,TRUE) THEN
              MEMDUMP(6'EMPTY DC',6'KEYIN   ' & IRW TAG)
            ELSE
              REPLACE POINTER(A,8) BY POINTER(MSG[1],8)
                  FOR MSG[0].LOWER2OF , 48"03";
    EXT:
      END DCKEYIN;

* XXXXXXXXXX          MARC handling MC request             XXXXXXXXXX
*
*
*     CID(MCV):       % issue MC (Make Compiler) command
================================================================================
                BEGIN
  CONCHK:       IF SYSTEMUSER THEN
                    BEGIN
  CON:              IF DILOG_MODE EQL SINGLE_LINE_MODE THEN
                        BEGIN
                        AFTER_SHOW_SCREEN:=INTO_SHOW;
                        ERR_MSG(INV_CTRLMSG_MODEV,MKEYWORD(TOKN));
                        END
                    ELSE
                        BEGIN
                        IF TALKING_TO_CONTROLLER THEN
                            BEGIN
                            IF NOT HAVE_MIX THEN
                                WORK2[0]:= 0;    % LENGTH OF MIX IS 0
                                                 % ELSE WORK2[0] ALREADY SET
```

```
                    KEYIN(FALSE,WORK2,FALSE);   % DO ACTUAL REQUEST
                    END
                ELSE
                    BEGIN
                    ERR_MSG(CONTROLLER_MUTEV,);
                    AFTER_SHOW_SCREEN:=INTO_SHOW;
                    END;
                END;
            END
        ELSE
            BEGIN
            AFTER_SHOW_SCREEN:=INTO_SHOW;
            ERR_MSG(NOT_OPERATOR_MSGV,);
            END;
        END;

* XXXXXXXXXX         MARC communications to CONTROLLER         XXXXXXXXXX
*
    PROCEDURE KEYIN (DONTWAIT, MIX_LIST, MYTASK);
    XXXXX
    % F: BUILD MESSAGE TO CONTROLLER BASED ON MIX_LIST AND CURRENT
    %    TOKEPTR FOR (TOKELEN + CLFT) AND SET AFTER_SHOW_SCREEN.
    % NOTE: MESSAGE IS SENT BY CYCLE_CONTROL
    XXXXX
*   VALUE DONTWAIT,     % MEANS DONT SETUP WAIT FOR OUTPUT
*         MYTASK;
*   BOOLEAN DONTWAIT,
*         MYTASK;
    ARRAY MIX_LIST[*];
    BEGIN
    DEFINE  MSG          = CONQ_MESSAGE #,
            BYTE_LENGTH  = MIX_LIST[0] #,
            MIX_START    = MIX_LIST[1] #,
            OFFSET6      = 41 #;
    INTEGER
            MESSAGE_NUM,
            TOTAL_LENGTH;
    LABEL XIT;
        IF CAND(BYTE_LENGTH LEQ 0,COR(ENDSEEN,NOT ALPHATOKEN)) THEN
            BEGIN
            SAY_MSG(KEYWORD_EXPECTEDV,
                    MSTRING("a CONTROLLER command",
                    LENGTH("a CONTROLLER command")) MTOKEN);
            GO XIT;
            END
        ELSE
            BEGIN
            IF ENDSEEN THEN
                TOTAL_LENGTH:=0
            ELSE
                BEGIN
                TOTAL_LENGTH:=TOKELEN+CLFT;
                UPCASE_EXCEPT_QUOTED_STRINGS(TOKEPTR,TOTAL_LENGTH);
                END;
            CONQ_MESSAGE_SIZE :=
                REAL((OFFSET6                       % 6 WORD OFFSET
                      + INTEGER(BYTE_LENGTH)        % LEN OF MIX LIST STRING
                      + 1                           % 1 BLK BETW/ LIST & CMD
                      + TOTAL_LENGTH                % LEN OF CMD STRING
                      + 1 ) DIV 6 );                % ENDING 0
            REPLACE POINTER(MSG[6]) BY
                    POINTER(MIX_START) FOR BYTE_LENGTH, " ",
                    TOKEPTR FOR TOTAL_LENGTH,0 FOR 1;
            TOTAL_LENGTH := * + BYTE_LENGTH + 1;
            IF DONTWAIT OR MYTASK THEN
                MESSAGE_NUM := 0
            ELSE
                MESSAGE_NUM := DILOG_MSG_NUMBER;
            MSG[0]:=0 & MSGTOCONTROLLER  TYPEF
                     & KEYINCOMMANDOUTV  VARTYPEF
                     & MYMCSNUMBER       VARTAILF
                     & (IF SYSTEMUSER OR MYTASK THEN DILOG_LSN ELSE 0)
                                         LSNF;
```

```
              MSG[1]:=0 & 0            CM TRUNCATEF      % DON'T TRUNCATE
                      & REAL(PRIVILEGEDUSER OR SYSTEMUSER OR MYTASK)
                                       CM RESTRICTF
                      & REAL(SYSTEMUSER OR MYTASK)
                                       CM PRIVILEGEF    % ODT CAPABILITIES
                      & MESSAGE_NUM    CM_MSGNUMF       % SPECIAL FOR US
                      & MY_DILOG_NUM   CM_DILOGF        % SPECIAL FOR US
                      & LINE_WIDTH     CM_LINEWIDTHF    % MAX LINE WIDTH
                      & 127            CM_NUMBEROFLINESF;
              IF NOT SYSTEMUSER AND NOT MYTASK THEN
                 BEGIN
                    MSG[2]:=0 & (DILOG_USERCODE_LN) [46:7] & 1 [47:1];
                    REPLACE POINTER(MSG[2])+1 BY DILOG_USERCODE
                         FOR DILOG_USERCODE_LN;
                 END;
              MSG[5]:=TOTAL_LENGTH;
              END;
     XIT:
       END KEYIN;

*  XXXXX   CONTROLLER handling MCS input (e.g., messages from MARC)   XXXXX
*
           IF T := REMOVE(INPUTMSG, REMOTEINPUTQ) LSS 4 THEN
              GO WAITFORMSG;
           MCSNUMBER := RQ_MCS(INPUTMSG);
           IF MCSNUMBER = 0 THEN
                 GO WAITFORMSG;
           IF INPUTMSG[0].[38:7] = 6 THEN
              BEGIN % MOS LOG-IN
              IF MOS_MCSNUMBER = 0 THEN
                 IF POINTER(INPUTMSG[1],8) = 48"FF" FOR 24 THEN
                    MOS_MCSNUMBER:=MCSNUMBER;
              GO TO WAITFORMSG;
              END;
           IF INPUTMSG[0].[38:7] = 7 THEN
              BEGIN % MOS LOG-OFF
              IF MOS_MCSNUMBER = MCSNUMBER
              AND POINTER(INPUTMSG[1],8) = 48"FF" FOR 24 THEN
                 MOS_MCSNUMBER:=0;
              GO TO WAITFORMSG;
              END;
           MOS_CALLING := (MCSNUMBER = MOS_MCSNUMBER);
           IF MOS_CALLING THEN
              BEGIN
              MOS_DIALOG:=INPUTMSG[1].[43:24];
              IF INPUTMSG[0].[39:8] > 7 AND INPUTMSG[0].[39:8] < 11 THEN
                 BEGIN
                 % 8=INPUT MSG & CLEAR DIALOG
                 % 9=CLEAR DIALOG
                 % 10=CONTINUATION REQUEST & CLEAR DIALOG
                 CLEAR_MOS_DIALOG(MOS_DIALOG);
                 INPUTMSG[0].[39:8]:=INPUTMSG[0].[39:8]-6;
                 END;
              END;
           ORIGINUNIT := INPUTMSG[0].[14:15];
           USERSPEC:=FALSE;
           IF BOOLEAN(INPUTMSG[1]).[45:1] THEN % PRIVILEGED MCS
              IF INPUTMSG[2].[46:7] NEQ 0 THEN % USERCODE PRESENT
                 PRIVMCS.PRIVMCSUSERF := 1;
           IF BOOLEAN(INPUTMSG[2]).[47:1] THEN
           BEGIN % MCS WANTS USERCODE CHECK
              IF J:=INPUTMSG[2].[46:7] GTR 17 THEN GO WAITFORMSG;
              REPLACE POINTER(ORIGINUSER) BY J.[7:48]
                 FOR 1,POINTER(INPUTMSG[2])+1 FOR J,0 FOR 17-J;
              USERSPEC:=TRUE;
              INPUTMSG[2] := 0;
           END;
           IF ORIGINUNIT NEQ 0 THEN
              ORIGINUNIT.ORGISREMOTEF := 1;
           DCKEYINFO := REAL(SENDSUPPRESS := MCSNUMBER NEQ 0);
           TERM[TI] := RI := 0] := 0;
           TERM[TI].TRESTRICTEDF := INPUTMSG[1].[46:1] + 1;
           %% Let an MCS have as many lines as it requests %%
           IF I := (J := INPUTMSG [1]).[7:8] LSS 2 THEN
              I := MAXLINES;
```

```
                    SET LINES (TI, I);
                    LINELIMIT := I;
                    IF I := J.[15:8] LSS 2 OR I GTR MAXWIDTH THEN
                        I := MAXWIDTH;
                    SET WIDTH (TI, I);
                    TERM[TI].TTRUNCATEF := J.[47:1];
                    IF BOOLEAN(INPUTMSG[1]).[45:1] THEN    % GIVE HIM THE SAME
                      BEGIN                                % PRIVILEGE AS A SPO.
                        PRIVMCS.PRIVMCSF   := 1;
                        PRIVMCS.PRIVMCSNOF := MCSNUMBER;
                        PRIVMCS.PRIVUNITNOF := ORIGINUNIT;
                        TERM[TI].TRESTRICTEDF := 0;
                        MCSNUMBER := 0;
                        ORIGINUNIT := 0;
                      END;
*                   INPUTMESSAGE;    % process input and handle command
                    SENDSUPPRESS := FALSE;
                    IF MDS CALLING THEN
                        SENDMSG(0)
                    ELSE
                    IF NOT NOENTRIES THEN SENDMSG(0);
                    GO WAITFORMSG;

* XXXXXXXX     CONTROLLER calling SETSTATUS and handling result   XXXXXXXX
*
#  CALLSETSTATUS:
#      GSRESULT := SETSTATUS(MISCREQUEST,SUBTYPE,V,A);
#      IF REAL(GSRESULT) GTR 1 THEN
#          ERROR(2, REAL(GSRESULT), A)
#      ELSE
#          IF GSRESULT THEN
#              ERROR(1,0,A)
#      ELSE
#      IF CONFIRMTYPE > 0 THEN
#      CONFIRM(CASE CONFIRMTYPE OF
#              BEGIN
                    (CNAME): NAMERESPONSE(SUBTYPE,V, A);
                    (CTIME): WHATTIME(TIME(1));
                    (CDATE):
                             REPLACE P:MSGSTART BY "DATE IS ";
                             SCRATCH [0]:=TIME(10);
                             WHATDATE(INTEGER(POINTER(SCRATCH)+1,5),P);
                             REPLACE P BY NUL;
                             SENDSIMPLEMSG(FIRSTLINE);
                    (DMNAME): SOFTWARESTATUS (O&SET(GSDMNAMELNK));
                    (RESP1):  RESPONSE1(RN);
                    (AUDITRESPONSE): RESPONSE1( V + AUCLOSERSP);
                    (CDCID):  SENDMSG(HOMEANDCLEAR);
                    ELSE :
                  END
              );
        IF NOT GSRESULT AND OPTIONCKT=(3 & 1 SOF) THEN
          BEGIN
            OPTIONCKT:=0;
            SELECTION;
          END;
    DONE:
    END GENERALREQUEST;
```

What is claimed is:

1. In a computer system having program files, the method of authorizing a code file as a compiler, comprising the steps of:

(a) establishing, via an operating system, a FILEKIND attribute value to differentiate files as to being a data file, a code file, or an authorized compiler;

(b) requesting, via a first program, the operating system to assign a FILEKIND value to a secondprogram, where said first program is prevented, by the operating system, from assigning a FILEKIND value that would indicate a code file or a compiler;

(c) establishing, via an operating system routine, the ability to assign a COMPILERCODEFILE value to a program's FILEKIND attribute where only a privileged user/privileged program is permitted access to the operating system routine, designated SETSTATUS, wherein said COMPUTERCODE FILE value represents an integer created by the operating system which designates a code file as a compiler;

(d) permitting, via a supervisory program designated DCKEYIN, that only a privileged user or privileged program, will get access capability to request, via said operating system routine, said operating system to authorize a code file as a compiler.

2. The method of claim 1 which includes the step of:

(6e) preventing, via said operating system, any ordinary user or ordinary program from changing the FILEKIND attribute value of a code file into a COMPILERCODEFILE value.

3. The method of claim 1 which includes the step of:
(7e) operating a program that invokes a Master Control Program (MCP) as the said operating system via the SETSTATUS entry point which will authorize a code file as a compiler by changing the FILEKIND value into a COMPILERCODEFILE value.

4. In a computer system, the method of controlling files which might be used as a compiler, comprising the steps of:
   (a) providing, through a system administrator, a Master Control Program (MCP) which includes an entry point designated SETSTATUS which has the capability of changing a FILEKIND attribute value of a designated file into a COMPILERCODEFILE value;
   (b) establishing a routine, designated as DCKEYIN, for receiving a MAKE COMPILER command from both ordinary programs and privileged programs;
   (c) denying, through said DCKEYIN routine, said ordinary programs from transmitting said MAKE COMPILER command to a CONTROLLER program, where said CONTROLLER program initiates entry into said SETSTATUS program entry point of said Master Control Program;
   (d) permitting, via said DCKEYIN routine, said privileged program to transmit said MAKE COMPILER command to said CONTROLLER program;
   (e) receiving, by said CONTROLLER program, of said MAKE COMPILER command from said DCKEYIN routine;
   (f) transmitting, by said CONTROLLER program, of said MAKE COMPILER command to said SETSTATUS entry point of said MCP operating system;
   (g) changing, via said SETSTATUS initiation of said MCP operating system, the FILEKIND value of said designated file into the COMPILERCODEFILE value which will authorize said designated file to operate as a compiler.

5. In a computer system, the method of controlling files which might be used as a compiler, comprising the steps of:
   (a) establishing, by a system administrator, a Master Control Program (MCP) which includes an entry point designated SETSTATUS having the capability of changing a FILEKIND attribute value of a designated file into a COMPILERCODEFILE value;
   (b) providing, via said system administrator, a CONTROLLER program to transmit MAKE COMPILER commands to said SETSTATUS entry point, and to receive MAKE COMPILER commands from a menu-assisted resource control (MARC) program;
   (c) inputting, from ordinary users and privileged users, the MAKE COMPILER commands into said MARC program;
   (d) inhibiting, by said MARC program, said MAKE COMPILER commands from said ordinary users;
   (e) transmitting, by said MARC program, said MAKE COMPILER commands from privileged users to said CONTROLLER program;
   (f) initiating, via said CONTROLLER program, of the SETSTATUS entry point of the Master Control Program to authorize the program designated by the MAKE COMPILER command.

6. The method of claim 5 which includes the step of:
(10g) generating, by said CONTROLLER program, the transmission of a MAKE COMPILER command, when originated from a privileged operator terminal, to said CONTROLLER program for input to said SETSTATUS entry point to achieve authorization of a code file as a compiler.

7. A method for ensuring that only properly privileged personnel and programs can authorize a code file as a compiler in a computer system, said method comprising the steps of:
   (a) providing, via a system administrator, a Master Control Program (MCP) operating system which includes safeguard routines to check any "MAKE COMPILER" command generated in said system, said MCP being initiated via a SETSTATUS entry point;
   (b) recognizing, by checking the FILEKIND attribute, via the said MCP operating system, whether a file is or is not a compiler;
   (c) assigning, via a program, a FILEKIND value to a file which will identify it as a "compiler" or as a "code file" or as a "system code file" or as a "data file";
   (d) checking out the source of any "MAKE COMPILER" commands by means of programs designated as DCKEYIN, and menu-assisted resource control (MARC) which cooperate with a CONTROLLER program which can allow or deny further transmission of the MAKE COMPILER command to the SETSTATUS entry point of the MCP operating system;
   (e) enabling, via the said SETSTATUS entry point and the MCP operating system, the MAKE COMPILER command to authorize a file to act as a compiler.

* * * * *